Figure 1:
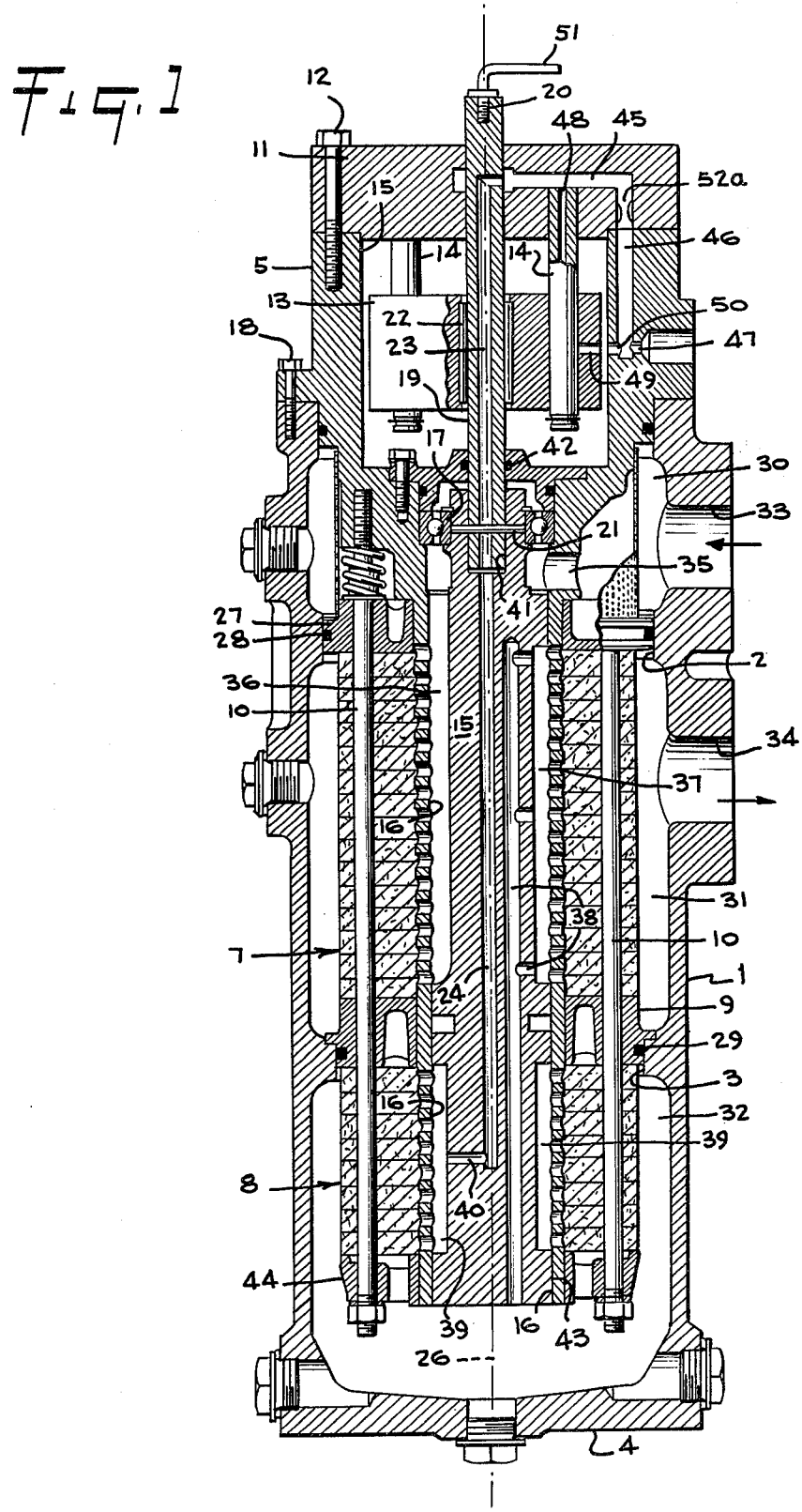

United States Patent [19]

Christophe et al.

[11] Patent Number: 4,481,111
[45] Date of Patent: Nov. 6, 1984

[54] SELF-CLEANING FILTER WITH MOTOR INCORPORATED THEREWITH

[75] Inventors: Théophile J. Christophe, Fontenay-le-Fleuri; Jean-Claude P. Moatti, Boulogne-Billancourt, both of France

[73] Assignee: Georges Moatti, Saint-Cyr-l'Ecole, France

[21] Appl. No.: 540,998

[22] Filed: Oct. 11, 1983

[30] Foreign Application Priority Data

Oct. 11, 1982 [FR] France ................................ 82 16982

[51] Int. Cl.³ ............................................ B01D 29/38
[52] U.S. Cl. ................................ 210/333.01; 210/345; 210/405
[58] Field of Search ............ 210/405, 377, 456, 433.1, 210/434, 489, 333.1, 335, 316, 314, 488, 333.6, 345

[56] References Cited

U.S. PATENT DOCUMENTS

| 3,561,602 | 2/1971 | Molitor | 210/335 |
| 3,944,488 | 3/1976 | Moatti | 210/405 |

FOREIGN PATENT DOCUMENTS

| 7118275 | 5/1971 | France | 210/405 |
| 7146847 | 12/1971 | France | 210/405 |
| 7214906 | 4/1972 | France | 210/405 |
| 7220654 | 6/1972 | France | 210/405 |

Primary Examiner—Ernest G. Therkorn
Assistant Examiner—John Donofrio
Attorney, Agent, or Firm—Mason, Fenwick & Lawrence

[57] ABSTRACT

The invention relates to a filter comprising a housing at inside which are provided two separate filtering zones, isolated one from the other, each zone containing a stack of filtering elements; at least one admission orifice for the fluid to be filtered; one rotary fluid distributor arranged so as to be co-axial to said filtering elements; and a motor driving the distributor coupled to a first end thereof, whereas the second end of the distributor is free with respect to the actual body of the filter, and is guided in rotation by said bore alone.

5 Claims, 2 Drawing Figures

SELF-CLEANING FILTER WITH MOTOR INCORPORATED THEREWITH

Filters are already known which comprise two filtering zones with one fluid distributor in the center, said distributor being mounted for rotating with respect to the filtering elements and to the body of the filter.

In these known filter designs, one end of the distributor is shaped as a pivot pin, mounted for rotating inside a bearing provided in one of the bases of the filter. In addition, the fluid to be filtered being admitted close to the end of the filter body containing the end of the distributor other than that shaped as a pivot pin, the fluid filtered in one of the filtering zones is removed through an exhaust situated close to the other end of the filter body containing the pivot pin-shaped end of the distributor. This type of assembly works adequately but it necessitates to use numerous seals and is, as a result, relatively complex and cumbersome.

It is the object of the present invention to overcome this by proposing a new structure, which is simplified for example by the elimination of the pivot pin at the end of the distributor, and also by the elimination of multiple chambers all isolated one from the other by seals, and which are necessary in prior designs.

The present invention therefore relates to a filter comprising a filter body inside which are provided two separate filtering zones, isolated one from the other, each zone containing a stack of filtering elements; at least one admission orifice for the fluid to be filtered; one rotary fluid distributor arranged so as to be coaxial to said filtering elements; and a motor driving the distributor and coupled to a first end thereof.

In said filter, the second end of the distributor is free with respect to the actual body of the filter, and is guided in rotation by said bore alone.

Preferably, the following dispositions are also adopted:

the second end of the distributor is contained in one of the two filtering zones in which the fluid flows from the outer periphery of the filtering elements contained in said filtering zone, towards said bore, whereas said bore issues into chambers provided on the periphery of the distributor, and whereas a conduit, internal to the distributor, connects said chambers with the first end of the distributor;

the orifice of admission of the fluid to be filtered and the orifice for removing from the filter body the filtered fluid liable to flow into said internal conduit, are situated on the end of the filter body adjacent said first end of the distributor;

the driving motor is of the type using fluid under pressure, the said conduit internal to the distributor being connected with the inlet for the fluid supplying said motor;

the conduit internal to the distributor is also communicating with an outlet for directly removing the filtered fluid from the filter body, whereas a restriction is provided in the circuit supplying the motor;

the outlet pipe for letting the fluid out of the motor communicates with said direct exhaust orifice.

Figure 2:
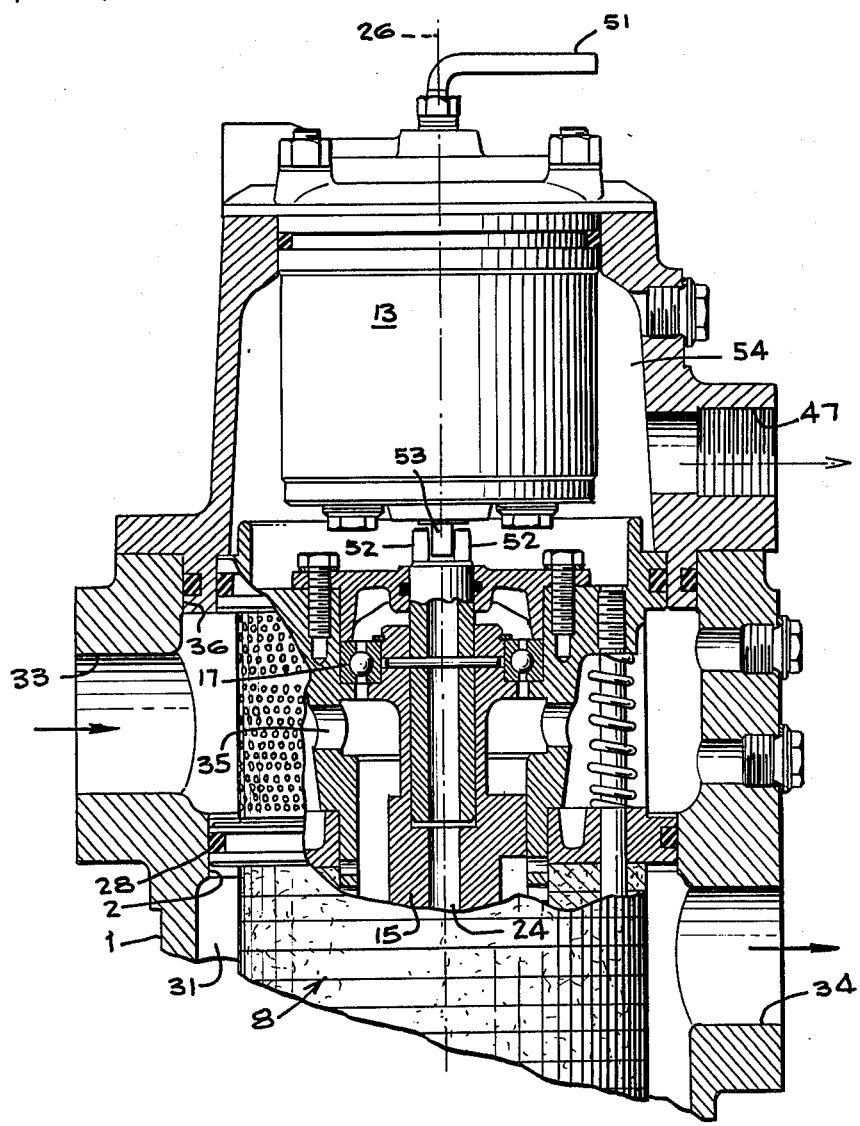

The invention will be more readily understood on reading the following description with reference to the accompanying drawings in which:

FIG. 1 is an axial section of a filter according to a first embodiment of the invention, and FIG. 2 is an axial section of part of a filter according to a second embodiment of the invention.

The filter shown in FIG. 1 comprises:

a housing 1, with two spaced apart cylindrical bearing surfaces 2 and 3, and defined by a transverse base 4, monoblock with the rest of the body 1, a casing 5, provided at the top with an opening 5 and secured to the body 1 by means of screws 18, two stacks 7 and 8, separated by an intermediate plate 9, and assembled together and with the plate 9 and the base of the casing 5, by means of tie-rods 10 traversing the assembly, a cover 11, fitting in the opening 6 of the the casing 5 and closing same, and secured to said casing by means of screws 12, a hydraulic motor 13, which is already known per se, and mounted inside the casing 5, sliding along vertical guiding rods 14, a fluid distributor 15, introduced in a central bore 16 provided in the two stacks 7, 8 and the intermediate plate 9, which distributor is mounted for rotation with respect to said stacks 7, 8 by means of a ball bearing 17 interposed between said distributor and the casing 5, a driving shaft 19, which, on the one hand traverses the cover 11 to issue, by its grooved upper end 20, outside the filter and is connected to the distributor by a cross-pin 21 and to the motor 13 by a known device consisting of a unidirectional and slidable free-wheel, diagrammatically represented in 22, and on the other hand, comprises a central bore 23, which issues at its lower end into a conduit 24 internal to the distributor 15 and coaxial to the bore 16 and to the rotation axis 26 of the distributor and of the shaft, and at its upper end into a circular groove 25 provided in the cover 11.

An upper plate 27, which defines the upper stack 7 of the filter elements, is in tight contact (28) with the upper cylindrical bearing surface 2 of the housing 1, whereas the intermediate plate 9 is in tight contact (29) with the lower bearing surface 3. Three seperate chambers 30, 31, 32 are thus defined in the housing 1, which chambers are separated one from the other: the chamber 30, of admission into the filter of the fluid to be filtered, which communicates with a fluid admission orifice 33; intermediate chamber 31, which defines a first filtering zone and receives the largest part of the fluid filtered by the elements of upper stack 7, whilst communicating with an orifice 34 for removing the filtered fluid from the housing 1; and lower chamber 32, which defines a second filtering zone and receives the part of the fluid filtered by the elements of stack 7 which has not come out through outlet orifice 34.

The fluid to be filtered which is contained in admission chamber 30, traverses an orifice 35 provided in the casing 5 and reaches a chamber 36 provided in the distributor 15 between the bore 16 of the stack 7 and said distributor 15, another chamber 37 also provided in the same way as chamber 36, being isolated from said chamber 36 and from admission chamber 30. The fluid contained in chamber 36 flows through the filter elements of stack 7 and, cleared of its impurities, reaches chamber 31. The greatest part of said filtered fluid is removed through outlet orifice 34, the rest flowing from the outer periphery towards the bore 16, through the part of the filter elements which communicates with chamber 37 to clear said elements from the impurities which have deposited therein, the different sectors of each filter element being thus periodically cleared due every time to a fraction of a turn rotation of the distributor.

The fluid charged with impurities reaches lower chamber 32 via conduits 38 internal to the distributors.

Said fluid flows through said elements from the outer periphery towards the bore 16 of the elements of stack 8 and once filtered, reaches a chamber 39 provided in the distributor 15 between bore 16 and said distributor. Conduits 40 connect chamber 39 to conduit 24. It should be noted that inner conduit 24 only issues at the top end 41 of the distributor 15, said end 41 being flared and receiving the lower part of the shaft 19 adapted thereto, with a sealing means (42). Moreover, the distributor 15 is only guided by the ball bearing 17 and the bore 16 and has its lower part 43 which does not extend beyond the stack 8 and the lower plate 44 defining said stack. In particular, the lower part 43 of the distributor 15 does not reach the bottom 4 of the housing 1 and is not in any way directly guided by the housing 1.

At the upper part of the filter, conduits 45 and 46 are provided in the cover 11 and in the casing 5, respectively, and connect the groove 25 to an additional outlet 47 for removing the fluid filtered by the elements of stack 8. Also to be noted is the re-grouping in the upper part of the filter of the admission orifice for the fluid to be filtered 33 and of the outlet for the filtered fluid 34 and 47, and in particular, the proximity of orifices 33 and 47.

Also to be noted is that the known motor 13 has its supply fluid admission orifices 48 provided in the rods 14 which open, to this effect, into conduit 45, its outlet orifices 49 communicating via the inside of the housing 5, with a conduit 50 provided in said housing and permanently connected with the additional outlet orifice 47. Moreover, a restriction 52a is placed inside the conduit 46 provided in the housing 5 in order to allow the pressurizing, in conduit 45, of the fluid supplying the motor 13.

Finally, it is possible for a key 51 to be adapted to the grooves 20 of the upper end of the shaft 19 for manually rotating the distributor 15.

Referring now to FIG. 2, this shows the same filter as that shown in FIG. 1 except for the fact that the motor 13 is not fed with the fluid conveyed through the inner conduit 24. The case of such a disposition occurs when the hydraulic-type motor 13 has a fluid inlet and a fluid outlet which are separate from the filtering circuit of the filter or else, when the motor 13 is electric, or the like. The upper end of the distributor 15 is shaped as a driving fork 52 which cooperates with a driving block 53 integral with the output shaft of the motor 13. The inner conduit 24 issues at its upper part on the inside of the chamber 54 defined by the housing 5 which chamber is itself connected with the additional outlet conduit 47.

The description given hereinabove reveals the absence of any additional chamber at the lower part of the filter which was before provided between the body 1 and the lower plate 44 of the stack 8, as well as of any guiding of the distributor 15 by the bottom 4 of the body 1.

The resulting new structure is simpler, more compact and as a result cheaper to produce. It is also more reliable since the tightness means which used to be required have also been eliminated.

This structure, it is found, is suitable for all cases, whether the motor is hydraulic and supplied from the filtered fluid (FIG. 1) or whether said motor is not supplied from said fluid (FIG. 2).

In addition, the re-grouping of the admission 33 and outlet 33, 47 orifices inside the same filtering zone is advantageous as regards the pipe fittings which are to be produced. Said zone is that which contains also the upper end (41, 52) of the distributor 15.

The invention is in now way limited to the description given hereinabove and on the contrary covers any modifications that can be brought thereto without departing from its scope or its spirit.

What we claim is:

1. A filter apparatus comprising a housing, first and second separate filtering zones provided in said housing, means isolating said filtering zones from each other, each of said filtering zones containing a stack of filtering elements, each of said stacks of filtering elements being coaxial to each other, tubular means defining an elongated bore extending through both of said filtering zones, at least one admission orifice in said housing for receiving fluid to be filtered, an elongated rotary fluid distributor having a first end in communication with fluid received from said admission orifice and also having a second end; said rotary fluid distributor matingly extending coaxially through said tubular means and said stacks of filtering elements, flow passageways provided in said rotary distributor for directing fluid through and receiving fluid from at least one of said filtering zones, a driving motor coupled to said distributor for rotating the distributor about its axis and wherein the second end of the distributor is not connected to the filter body and is guided for rotation solely by said bore in said tubular member and wherein the second end of the distributor is contained in the second filtering zone and wherein the fluid flows from the outer periphery of the filtering elements contained in the second filtering zone radially inward into said bore and then into one of said passageways comprising a chamber provided in the periphery of the distributor and said passageways further including an internal conduit in the distributor connecting said chamber with the first end of the distributor.

2. A filter apparatus as claimed in claim 1 wherein the admission orifice for the fluid to be filtered and an orifice for removing filter fluid from the housing received from said internal conduit are situated on an end of the housing adjacent the first end of the distributor.

3. A filter apparatus as claimed in claim 1 wherein said driving motor is a hydraulic motor and the internal conduit of the distributor is connected to a power fluid inlet for the hydraulic motor.

4. A filter apparatus as claimed in claim 3 wherein the internal conduit in the distributor is also in communication with a direct exhaust outlet for directly discharging the filter fluid from the filter body and further including a restriction provided in the connection supplying fluid to the hydraulic motor.

5. A filter as claimed in claim 4 wherein hydraulic motor includes an outlet pipe for exhausting the fluid from the motor with said outlet pipe communicating with said direct exhaust outlet.

* * * * *

UNITED STATES PATENT AND TRADEMARK OFFICE
CERTIFICATE OF CORRECTION

PATENT NO. : 4,481,111

DATED : November 6, 1984

INVENTOR(S) : Theophile J. Christophe et al.

It is certified that error appears in the above-identified patent and that said Letters Patent is hereby corrected as shown below:

Figure 1 of the drawings should be deleted to appear as per the attached Figure 1.

Signed and Sealed this

Twenty-first Day of May 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,481,111                    Page 2 of 2

DATED : November 6, 1984

INVENTOR(S) : Theophile J. Christophe, Fontenay-le-Fleuri; Jean-Claude P. Moatti, Boulogne-Billancourt.

It is certified that error appears in the above-identified patent and that said Letters Patent are hereby corrected as shown below:

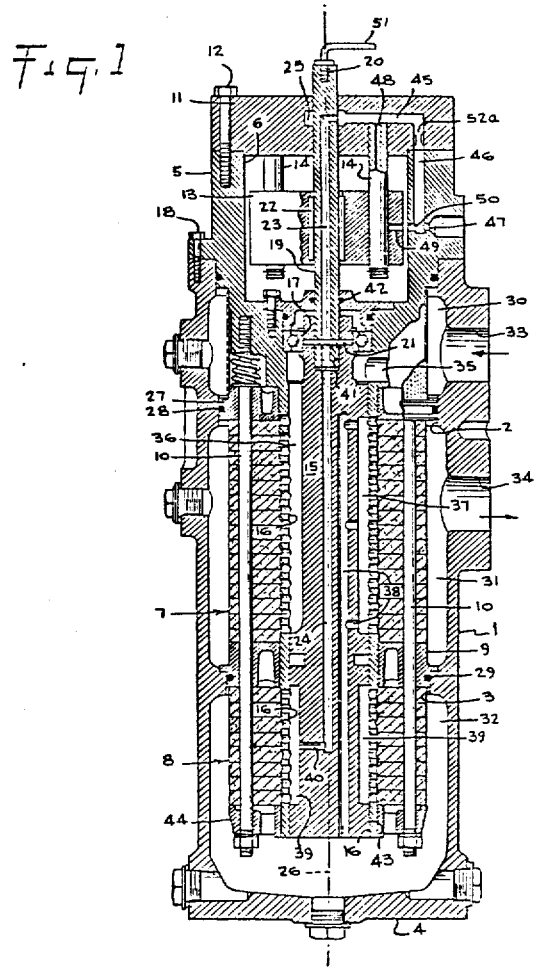

Column 2, line 7, both occurances of "5" should read --6--.